United States Patent
Huang

(10) Patent No.: US 9,568,165 B2
(45) Date of Patent: Feb. 14, 2017

(54) ILLUMINATION SYSTEM AND PROJECTION APPARATUS WITH SAME

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 89 days.

(21) Appl. No.: 14/489,971

(22) Filed: Sep. 18, 2014

(65) Prior Publication Data

US 2015/0338061 A1 Nov. 26, 2015

(30) Foreign Application Priority Data

May 26, 2014 (TW) .............................. 103118316 A

(51) Int. Cl.
| | |
|---|---|
| *F21V 9/08* | (2006.01) |
| *F21V 9/14* | (2006.01) |
| *F21V 7/04* | (2006.01) |
| *G03B 21/20* | (2006.01) |
| *G02B 26/04* | (2006.01) |

(52) U.S. Cl.
CPC . *F21V 9/08* (2013.01); *F21V 7/04* (2013.01); *F21V 9/14* (2013.01); *G02B 26/04* (2013.01); *G03B 21/204* (2013.01); *G03B 21/2013* (2013.01); *G03B 21/2066* (2013.01)

(58) Field of Classification Search
CPC ... G03B 21/204; G03B 21/2073; G03B 33/08; H04N 9/3111; H04N 9/3161; H04N 9/3164

See application file for complete search history.

(56) References Cited

U.S. PATENT DOCUMENTS

2005/0280785 A1* 12/2005 Beeson ................ H04N 9/3117
353/97
2011/0187998 A1* 8/2011 Kimura .............. G03B 21/2073
353/20

(Continued)

FOREIGN PATENT DOCUMENTS

| CN | 102937773 | 2/2013 |
|---|---|---|
| CN | 103091955 A | 5/2013 |
| TW | 201415155 | 4/2014 |

*Primary Examiner* — Sultan Chowdhury
(74) *Attorney, Agent, or Firm* — Kirton McConkie; Evan R. Witt

(57) ABSTRACT

An illumination system for a projection device is provided. The projection device emits a first waveband light along a first optical path. The illumination system includes a wavelength conversion element, a sequential light-filtering device, and a light guiding device. The wavelength conversion element converts the first waveband light into a second waveband light along a second optical path. The sequential light-filtering device sequentially filters the first waveband light and the second waveband light along a third optical path. The light guiding device guides the first waveband light and the second waveband light along a third optical path or guides the first waveband light to the wavelength conversion element. Consequently, the first waveband light and a first light beam and a second light beam of the second waveband light are sequentially filtered by the sequential light-filtering device and projected out.

20 Claims, 17 Drawing Sheets

(56) References Cited

U.S. PATENT DOCUMENTS

| | | | |
|---|---|---|---|
| 2011/0211333 A1* | 9/2011 | Bartlett | G03B 21/204 362/84 |
| 2012/0062857 A1* | 3/2012 | Saitou | G02B 5/22 353/98 |
| 2012/0127435 A1 | 5/2012 | Kitano et al. | |
| 2012/0133903 A1* | 5/2012 | Tanaka | G03B 21/2013 353/31 |
| 2013/0100417 A1* | 4/2013 | Yang | G03B 21/204 353/31 |
| 2013/0242534 A1* | 9/2013 | Pettitt | G03B 21/204 362/84 |
| 2014/0146244 A1* | 5/2014 | Finsterbusch | G03B 21/204 349/9 |
| 2015/0204514 A1 | 7/2015 | Cao et al. | |

* cited by examiner

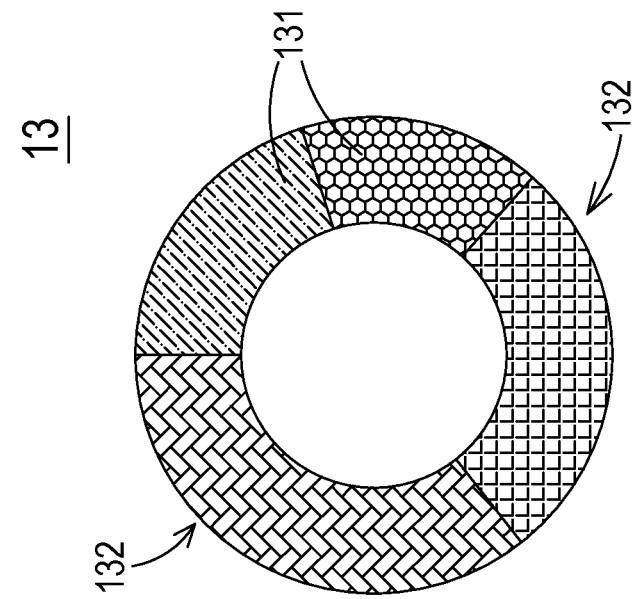
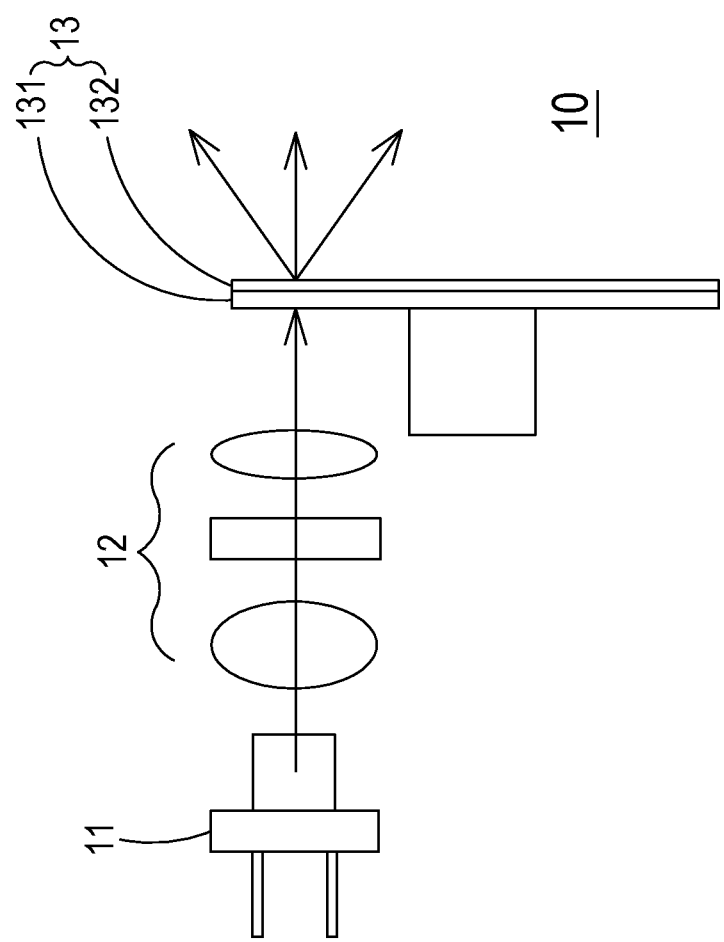
FIG. 1B PRIOR ART
FIG. 1A PRIOR ART

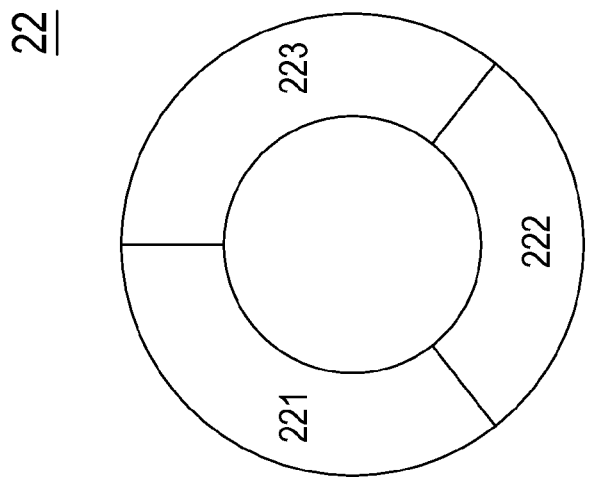
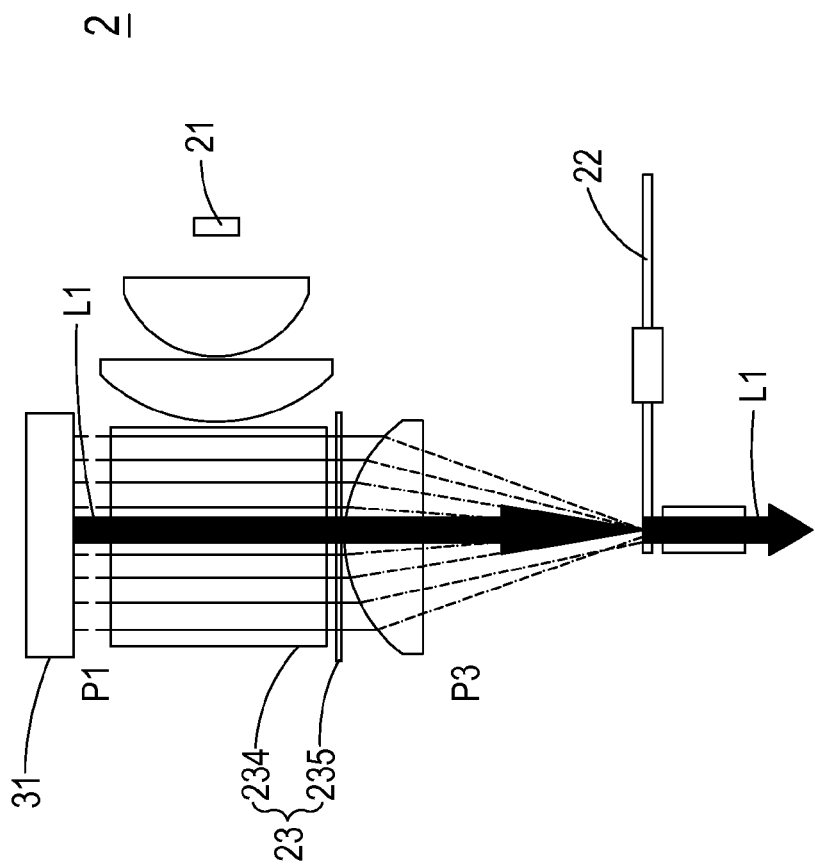
FIG. 6B
FIG. 6A

US 9,568,165 B2

ILLUMINATION SYSTEM AND PROJECTION APPARATUS WITH SAME

FIELD OF THE INVENTION

The present invention relates to an illumination system and a projection apparatus with the illumination system, and more particularly to an illumination system for sequentially producing color lights and a projection apparatus with the illumination system.

BACKGROUND OF THE INVENTION

In recent years, with the advancement of technologies for manufacturing projection devices, lightweight and slim projection devices have become the mainstream product in the market. The demands on new and improved products in the market have led to the continuous improvement of the design of projection devices. Accordingly, manufacturers of projection devices continuously develop small projection devices with a high efficiency and better imaging quality in order to satisfy the needs in the market.

Consequently, laser-phosphor based projectors were proposed to meet this requirement. FIG. 1A schematically illustrates the architecture of a conventional illumination system used in a single-chip digital light processing projector (DLP projector). FIG. 1B schematically illustrates a phosphor wheel of the illumination system of FIG. 1A. As shown in FIGS. 1A and 1B, the conventional illumination system 10 comprises a laser source 11, a lens group 12, and a phosphor wheel 13. The phosphor wheel 13 comprises plural segments 132 containing different phosphor agents 131. A laser light from the laser source 11 is transmitted through the lens group 12 and incident to the phosphor wheel 13 in order to excite a corresponding phosphor agent 131 of the phosphor wheel 13. Consequently, a color light with a longer wavelength (e.g. a red light) is produced. Upon rotation of the phosphor wheel 13, the plural segments 132 and the corresponding phosphor agents 131 of the phosphor wheel 13 are sequentially irradiated by the incident light. Consequently, various color lights (e.g. a red light, a green light, a yellow light and a blue light) are sequentially produced.

However, the conventional illumination system cannot be applied to a reflection-type phosphor wheel. Moreover, it is problematic to use color filters and phosphor agents on the phosphor wheel collaboratively. For example, the color lights outputted from the phosphor agents are scattered in all directions. According to the specifications, the incident angles relative to the color filters must be within a limited value in order to achieve good filtering performance.

From the above discussions, the conventional illumination system has complicated structures and fails to be applied to the reflection-type phosphor wheel. Moreover, the uses of the color filters cannot achieve good filtering performance. Since the wavelength conversion efficiency is impaired, the image quality is adversely affected.

Therefore, there is a need of providing an improved illumination system and a projection device with the illumination system in order to overcome the above drawbacks.

SUMMARY OF THE INVENTION

An object of the present invention provides an illumination system and a projection device with the illumination system, in which the structures are simplified, the wavelength conversion efficiency is increased, and the image quality is enhanced.

Another object of the present invention provides an illumination system and a projection device with the illumination system, in which the wavelength conversion element and the sequential light-filtering device are arranged in the second optical path and the third optical path, respectively. Consequently, the structures are simplified, the overall volume of the projection device is reduced, the filtering performance is enhanced, and the image quality is enhanced.

A further object of the present invention provides an illumination system and a projection device with the illumination system, in which the illumination system uses the ordinary optical elements to create special optical paths. Consequently, the light conversion efficiency and the filtering performance are enhanced.

In accordance with an aspect of the present invention, there is provided an illumination system for a projection device. The projection device emits a first waveband light along a first optical path. The illumination system includes a wavelength conversion element, a sequential light-filtering device, and a light guiding device. The wavelength conversion element is used for converting the first waveband light into a second waveband light, wherein the second waveband light is propagated along a second optical path. The sequential light-filtering device is used for sequentially filtering the first waveband light and the second waveband light along a third optical path. The light guiding device is arranged in and connected to the first optical path, the second optical path and the third optical path for guiding the first waveband light and the second waveband light along the third optical path or guiding the first waveband light to the wavelength conversion element. Consequently, the first waveband light and a first light beam and a second light beam of the second waveband light are sequentially filtered by the sequential light-filtering device and sequentially projected out.

In accordance with another aspect of the present invention, there is provided a projection device. The projection device includes a first solid-state light-emitting element and an illumination system. The first solid-state light-emitting element is used for emitting a first waveband light along a first optical path. The illumination system includes a wavelength conversion element, a sequential light-filtering device, and a light guiding device. The wavelength conversion element is used for converting the first waveband light into a second waveband light, wherein the second waveband light is propagated along a second optical path. The sequential light-filtering device is used for sequentially filtering the first waveband light and the second waveband light along a third optical path. The light guiding device is arranged in and connected to the first optical path, the second optical path and the third optical path for guiding the first waveband light and the second waveband light along the third optical path or guiding the first waveband light to the wavelength conversion element. Consequently, the first waveband light and a first light beam and a second light beam of the second waveband light are sequentially filtered by the sequential light-filtering device and sequentially projected out.

The above contents of the present invention will become more readily apparent to those ordinarily skilled in the art after reviewing the following detailed description and accompanying drawings, in which:

BRIEF DESCRIPTION OF THE DRAWINGS

FIG. 1A schematically illustrates the architecture of a conventional illumination system used in a single-chip DLP projector;

FIG. 1B schematically illustrates a phosphor wheel of the illumination system of FIG. 1A;

FIG. 6A schematically illustrates the architecture of an illumination system according to a second embodiment of the present invention;

FIG. 6B schematically illustrates a sequential light-filtering device of the illumination system according to the second embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2B:
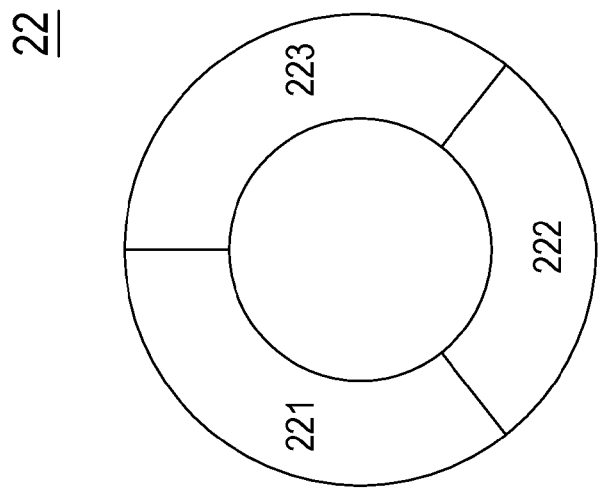
FIG. 2B schematically illustrates a sequential light-filtering device of the illumination system according to the first embodiment of the present invention.
Figure 2A:
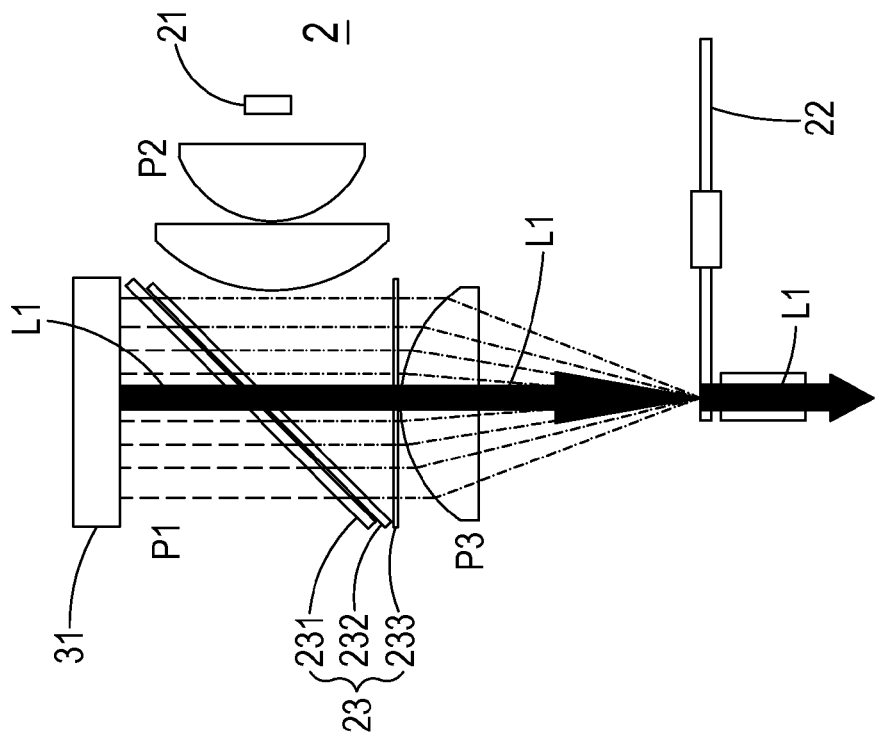
FIG. 2A schematically illustrates the architecture of an illumination system according to a first embodiment of the present invention.
Figure 3:
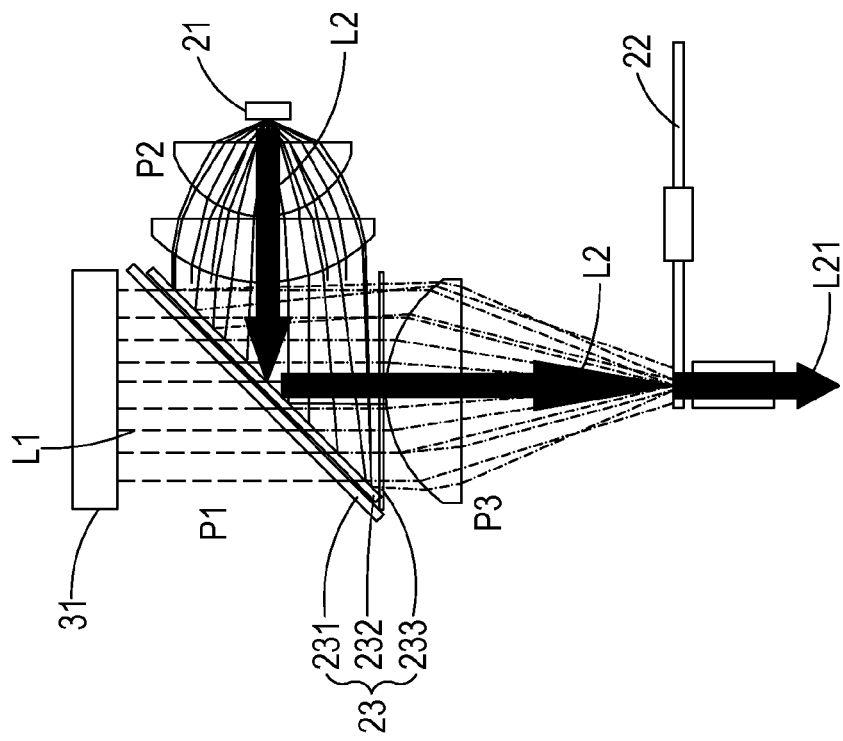
FIG. 3 schematically illustrates a first light beam of a second waveband light passing through the sequential light-filtering device of FIG. 2B.
Figure 4:
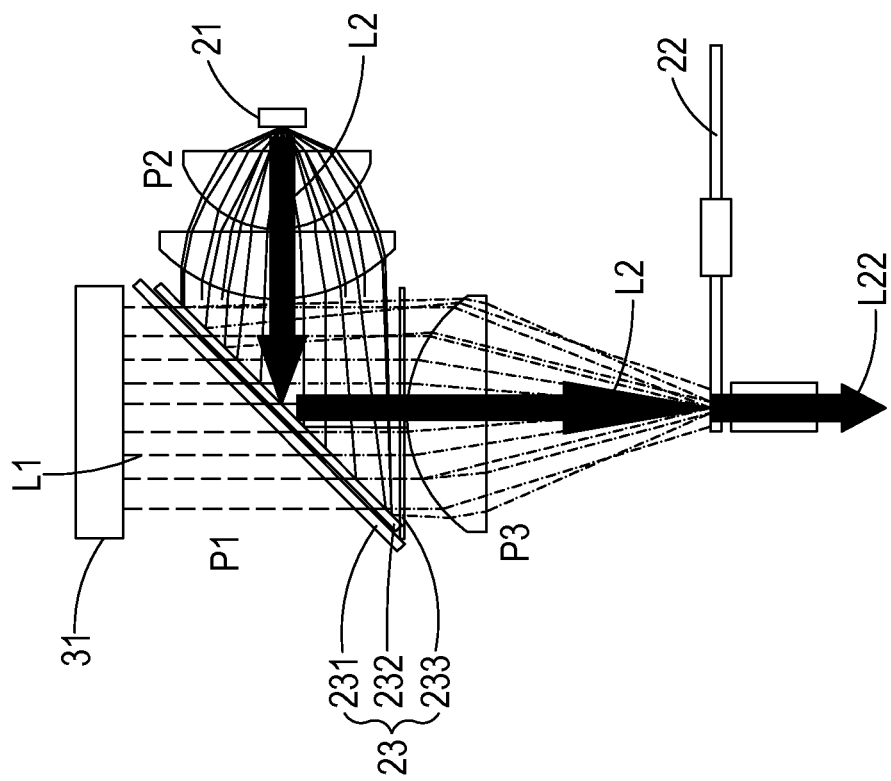
FIG. 4 schematically illustrates a second light beam of the second waveband light passing through the sequential light-filtering device of FIG. 2B.
Figure 5:
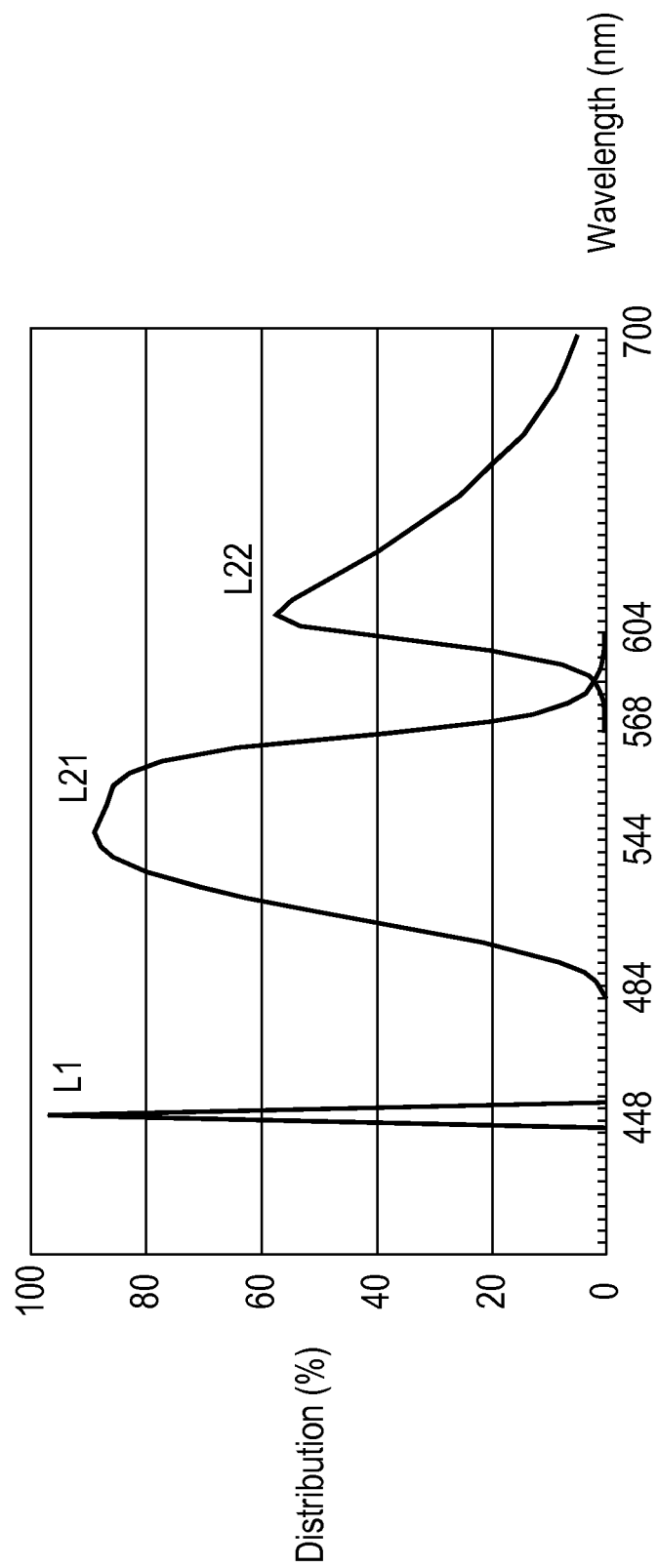
FIG. 5 schematically illustrates the wavelength distributions of the first waveband light and the first light beam and the second light beam of the second waveband light of the illumination system according to the first embodiment of the present invention.

FIG. 2A schematically illustrates the architecture of an illumination system according to a first embodiment of the present invention. FIG. 2B schematically illustrates a sequential light-filtering device of the illumination system according to the first embodiment of the present invention. FIG. 3 schematically illustrates a first light beam of a second waveband light passing through the sequential light-filtering device of FIG. 2B. FIG. 4 schematically illustrates a second light beam of the second waveband light passing through the sequential light-filtering device of FIG. 2B. FIG. 5 schematically illustrates the wavelength distributions of the first waveband light and the first light beam and the second light beam of the second waveband light of the illumination system according to the first embodiment of the present invention.

Please refer to FIGS. 2A, 2B, 3, 4 and 5. The illumination system 2 is applied to a projection device for at least emitting a first waveband light along a first optical path P1. For example, the projection device has a first solid-state light-emitting element 31 for emitting the first waveband light L1. The illumination system 2 comprises a wavelength conversion element 21, a sequential light-filtering device 22, and a light guiding device 23. In an embodiment, the wavelength conversion element 21 is a wavelength conversion material (e.g. phorsphor agent). The wavelength conversion element 21 may convert the first waveband light L1 into a second waveband light L2. The second waveband light L2 is propagated along a second optical path P2. An example of the sequential light-filtering device 22 includes but is not limited to a color filter wheel. The sequential light-filtering device 22 is used for sequentially filtering the first waveband light L1 and the second waveband light L2. The light guiding device 23 is arranged between the first solid-state light-emitting element 31, the wavelength conversion element 21 and the sequential light-filtering device 22. The light guiding device 23 is used for guiding the first waveband light L1 and the second waveband light L2 along a third optical path P3 or guiding the first waveband light L1 to the wavelength conversion element 21. When the wavelength conversion element 21 is excited by the first waveband light L1 and converted into the second waveband light L2, the first waveband light L1 and a first light beam L21 and a second light beam L22 of the second waveband light L2 are sequentially filtered by the sequential light-filtering device 22. Consequently, the first waveband light L1 and the first light beam L21 and the second light beam L22 are sequentially projected out.

In this embodiment, the light guiding device 23 comprises a polarization beam splitter (PBS) 231, a dichroic mirror 232, and a quarter wave plate 233. For example, the polarization beam splitter 231 is a wire-grid type polarization beam splitter. The polarization beam splitter 231 is arranged in the first optical path P1 and aligned with the first solid-state light-emitting element 31. The P-polarized light is transmissible through the polarization beam splitter 231, but the S-polarized light is reflected by the polarization beam splitter 231. The dichroic mirror 232 is arranged beside the polarization beam splitter 231. Preferably, the dichroic mirror 232 is in parallel with the polarization beam splitter 231, but is not limited thereto. The quarter wave plate 233 is opposed to the polarization beam splitter 231 with respect to the dichroic mirror 232. Moreover, the quarter wave plate 233 is arranged in the third optical path P3. In case that the P-polarized light of the first waveband light L1 is transmitted through the quarter wave plate 233 twice, the first waveband light L1 has the S polarization state. In this embodiment, the first waveband light L1 is a blue light, and the second waveband light L2 is a yellow light. Moreover, the first solid-state light-emitting element 31 is a blue solid-state light-emitting element (e.g. a blue laser element), and the wavelength conversion element 21 is a yellow phorsphor agent. Generally, the yellow light is a mixed light of a green light and a red light. For sequentially projecting the three primary color lights, the first light beam L21 and the second light beam L22 of the second waveband light L2 are the green light and the red light, respectively. Moreover, the blue light is transmissible through the dichroic mirror 232, but the yellow light is reflected by the dichroic mirror 232.

The first optical path P1 is the optical path between the first solid-state light-emitting element 31 and the polarization beam splitter 231. The second optical path P2 is the optical path between the wavelength conversion element 21 and the dichroic mirror 232. The third optical path P3 is the optical path between the dichroic mirror 232 and the sequential light-filtering device 22 and outputted from the sequential light-filtering device 22. Moreover, the sequential light-filtering device 22 comprises a first segment 221, a second segment 222, and a third segment 223. The first segment 221 is a transparent segment, the second segment 222 is a green segment, and the third segment 223 is a red segment. For example, the first segment 221 is made of glass or other transparent material, the second segment 222 comprises a glass plate and a green color filter on the glass plate, and the third segment 223 comprises a glass plate and a red color filter on the glass plate.

The operations of the illumination system 2 will be illustrated as follows in more details. The first solid-state light-emitting element 31 emits the first waveband light L1 (i.e. the blue light) along the first optical path P1. The P-polarized light of the first waveband light L1 is transmitted through the polarization beam splitter 231 of the light guiding device 23 and propagated along the third optical path P3. Then, the P-polarized light of the first waveband light L1 is transmitted through the quarter wave plate 233 and directed to the sequential light-filtering device 22. When the first segment 221 of the sequential light-filtering device 22 is rotated to the third optical path P3, the first waveband light L1 is directly transmitted through the first segment 221 and projected out.

On the other hand, when the second segment 222 or the third segment 223 of the sequential light-filtering device 22 is rotated to the third optical path P3, the first waveband light L1 is reflected by the second segment 222 or the third segment 223 of the sequential light-filtering device 22 and then transmitted through the quarter wave plate 233. Since the P-polarized light of the first waveband light L1 is transmitted through the quarter wave plate 233 twice, the P-polarized light is converted into the S-polarized light. The S-polarized light of the first waveband light L1 is transmitted through the dichroic mirror 232 and reflected by the polarization beam splitter 231. Due to the property of the polarization beam splitter 231, the first waveband light L1 is reflected to the wavelength conversion element 21. In this embodiment, the wavelength conversion element 21 contains the reflection-type phorshor agent. When the first waveband light L1 is received or absorbed by the wavelength conversion element 21, the first waveband light L1 is converted into the second waveband light L2. The second waveband light L2 is propagated along the second optical path P2. Then, the second waveband light L2 is reflected by the dichroic mirror 232 and directed along the third optical path P3. Then, the second waveband light L2 is directed to the sequential light-filtering device 22. When the second segment 222 of the sequential light-filtering device 22 is rotated to the third optical path P3, the first light beam L21 of the second waveband light L2 is transmitted through the second segment 222 and projected out (see FIG. 3). Whereas, when the third segment 223 of the sequential light-filtering device 22 is rotated to the third optical path P3, the second light beam L22 of the second waveband light L2 is transmitted through the third segment 223 and projected out (see FIG. 4). From the above discussions, the first waveband light L1 and the first light beam L21 and the second light beam L22 are sequentially projected out.

The wavelength distributions of the first waveband light L1 and the first light beam L21 and the second light beam L22 are shown in FIG. 5. Since the wavelength conversion element 21 and the sequential light-filtering device 22 are arranged in the second optical path P2 and the third optical path P3, respectively, the overall volume of the projection device can be reduced, and the filtering performance can be enhanced. Under this circumstance, the performance of the color lights and the image quality are enhanced.

Figure 7:
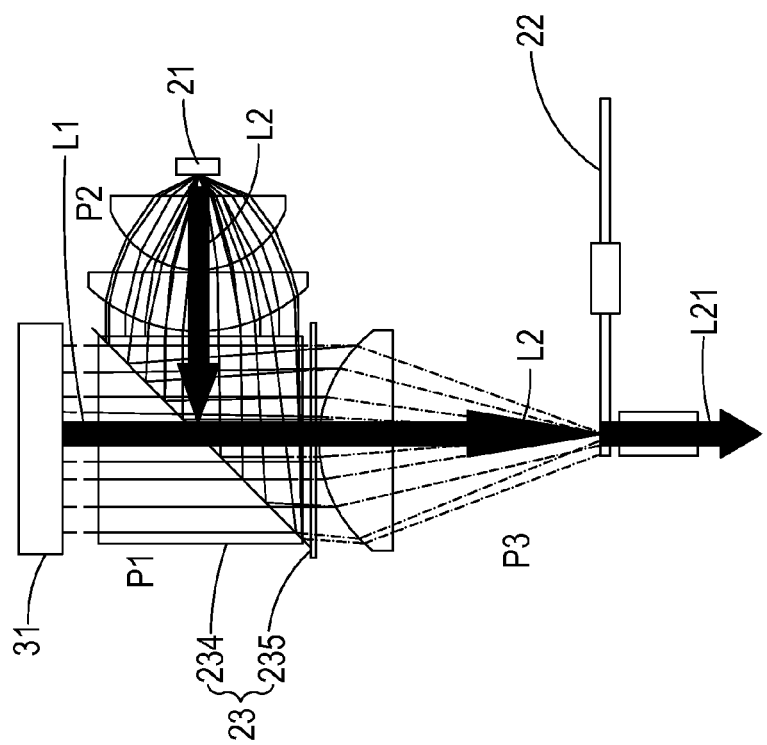
FIG. 7 schematically illustrates a first light beam of a second waveband light passing through the sequential light-filtering device of FIG. 6B.
Figure 8:
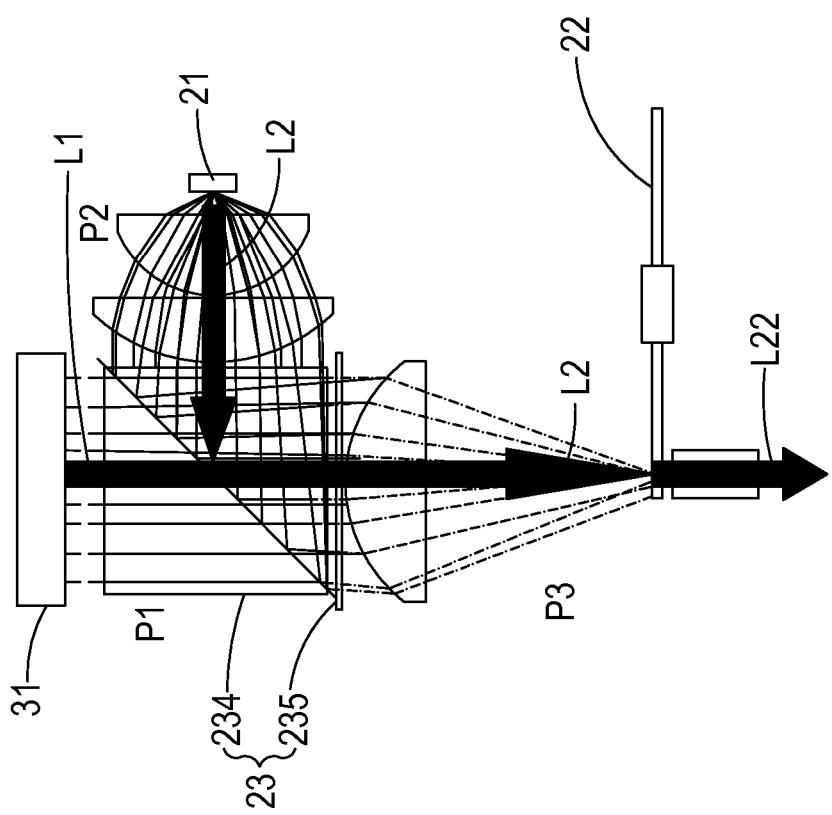
FIG. 8 schematically illustrates a second light beam of the second waveband light passing through the sequential light-filtering device of FIG. 6B.
Figure 9:
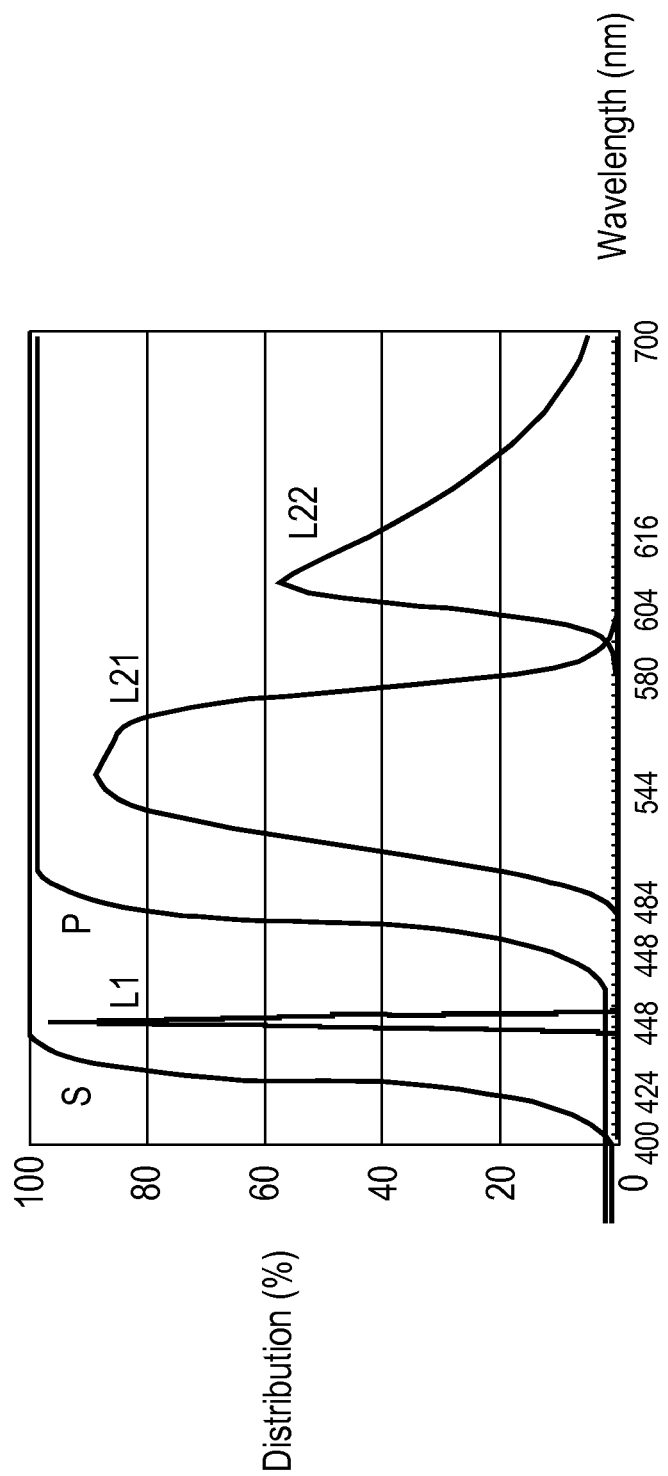
FIG. 9 schematically illustrates the wavelength distributions of the P-polarized light and the S-polarized light of the first waveband light of the illumination system according to the first embodiment of the present invention.

FIG. 6A schematically illustrates the architecture of an illumination system according to a second embodiment of the present invention. FIG. 6B schematically illustrates a sequential light-filtering device of the illumination system according to the second embodiment of the present invention. FIG. 7 schematically illustrates a first light beam of a second waveband light passing through the sequential light-filtering device of FIG. 7B. FIG. 8 schematically illustrates a second light beam of the second waveband light passing through the sequential light-filtering device of FIG. 6B. FIG. 9 schematically illustrates the wavelength distributions of the P-polarized light and the S-polarized light of the first waveband light of the illumination system according to the first embodiment of the present invention.

Please refer to FIGS. 6A, 6B, 7, 8 and 9. The illumination system 2 is applied to a projection device for at least emitting a first waveband light along a first optical path P1. For example, the projection device has a first solid-state light-emitting element 31 for emitting the first waveband light L1. The illumination system 2 comprises a wavelength conversion element 21, a sequential light-filtering device 22, and a light guiding device 23. The functions of the wavelength conversion element 21 and the sequential light-filtering device 22 of this embodiment are identical to those of the first embodiment, and are not redundantly described herein. In this embodiment, the light guiding device 23 comprises a polarization beam splitter (PBS) cube 234 and a quarter wave plate 235. The polarization beam splitter cube 234 is arranged in and connected to the first optical path P1, the second optical path P2 and the third optical path P3. Moreover, the polarization beam splitter cube 234 is arranged between the first solid-state light-emitting element 31, the wavelength conversion element 21 and the quarter wave plate 235. The P-polarized light is transmissible through the polarization beam splitter cube 234, but the S-polarized light is reflected by the polarization beam splitter cube 234. The quarter wave plate 235 is opposed to the first solid-state light-emitting element 31 with respect to the polarization beam splitter cube 234. Moreover, the quarter wave plate 235 is arranged in the third optical path P3, and in parallel with the first solid-state light-emitting element 31 and the polarization beam splitter cube 234. In case that the P-polarized light of the first waveband light L1 is transmitted through the quarter wave plate 235 twice, the first waveband light L1 has the S polarization state. In this embodiment, the first waveband light L1 is a blue light, and the second waveband light L2 is a yellow light. Moreover, the first solid-state light-emitting element 31 is a blue solid-state light-emitting element (e.g. a blue laser element), and the wavelength conversion element 21 is a yellow phorsphor agent. Generally, the yellow light is a mixed light of a green light and a red light. For sequentially projecting the three primary color lights, the first light beam L21 and the second light beam L22 of the second waveband light L2 are the green light and the red light, respectively.

The first optical path P1 is the optical path between the first solid-state light-emitting element 31 and the polarization beam splitter cube 234. The second optical path P2 is the optical path between the wavelength conversion element 21 and the polarization beam splitter cube 234. The third optical path P3 is the optical path between the polarization beam splitter cube 234 and the sequential light-filtering device 22 and outputted from the sequential light-filtering device. Moreover, the sequential light-filtering device 22 comprises a first segment 221, a second segment 222, and a third segment 223. The structures and functions of the sequential light-filtering device 22 are similar to those of the first embodiment, and are not redundantly described herein.

The operations of the illumination system 2 will be illustrated as follows in more details. The first solid-state light-emitting element 31 emits the first waveband light L1 (i.e. the blue light) along the first optical path P1. The P-polarized light of the first waveband light L1 is transmitted through the polarization beam splitter cube 234 of the light guiding device 23 and propagated along the third optical path P3. Then, the P-polarized light of the first waveband light L1 is transmitted through the quarter wave plate 235 and directed to the sequential light-filtering device 22. When the first segment 221 of the sequential light-filtering device 22 is rotated to the third optical path P3, the first waveband light L1 is directly transmitted through the first segment 221 and projected out.

On the other hand, when the second segment 222 or the third segment 223 of the sequential light-filtering device 22 is rotated to the third optical path P3, the first waveband light L1 is reflected by the second segment 222 or the third segment 223 of the sequential light-filtering device 22 and then transmitted through the quarter wave plate 235. Since the P-polarized light of the first waveband light L1 is transmitted through the quarter wave plate 235 twice, the P-polarized light is converted into the S-polarized light. Then, the S-polarized light of the first waveband light L1 is reflected to the wavelength conversion element 21 by the polarization beam splitter cube 234. When the first waveband light L1 is received or absorbed by the wavelength conversion element 21, the first waveband light L1 is converted into the second waveband light L2. The second waveband light L2 is propagated along the second optical path P2. Then, the second waveband light L2 is reflected by the polarization beam splitter cube 234 and directed along the third optical path P3. Then, the second waveband light L2 is directed to the sequential light-filtering device 22. when the second segment 222 of the sequential light-filtering device 22 is rotated to the third optical path P3, the first light beam L21 of the second waveband light L2 is transmitted through the second segment 222 and projected out (see FIG. 7). Whereas, when the third segment 223 of the sequential light-filtering device 22 is rotated to the third optical path P3, the second light beam L22 of the second waveband light L2 is transmitted through the third segment 223 and projected out (see FIG. 8). From the above discussions, the first waveband light L1 and the first light beam L21 and the second light beam L22 are sequentially projected out.

The wavelength distributions of the P-polarized light and the S-polarized light of the first waveband light L1 with respect to the polarization beam splitter cube 234 of the light guiding device 23 are shown in FIG. 9. From the above descriptions, the illumination system 2 uses the ordinary optical elements to create special optical paths. However, the light conversion efficiency and the filtering performance are enhanced.

Figure 10B:
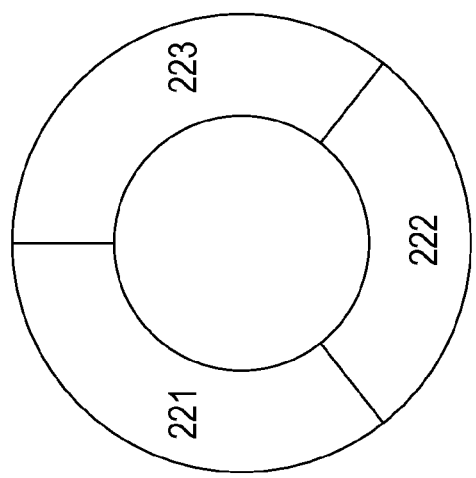
FIG. 10B schematically illustrates a sequential light-filtering device of the illumination system according to the third embodiment of the present invention.
Figure 10A:
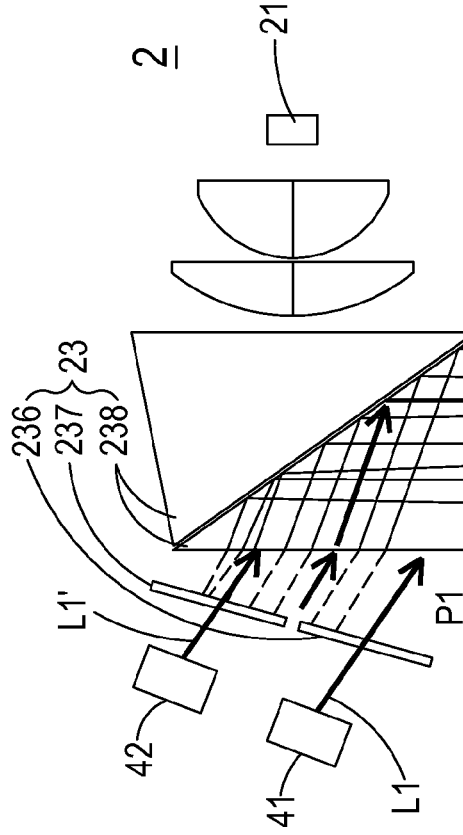
FIG. 10A schematically illustrates the architecture of an illumination system according to a third embodiment of the present invention.
Figure 11:
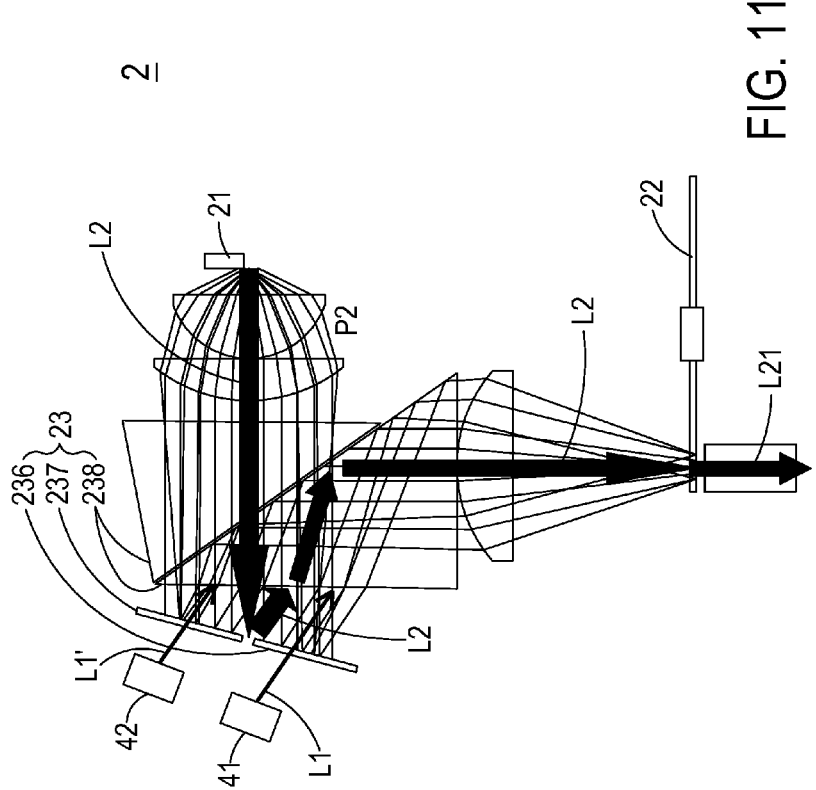
FIG. 11 schematically illustrates a first light beam of a second waveband light passing through the sequential light-filtering device of FIG. 10B.
Figure 12:
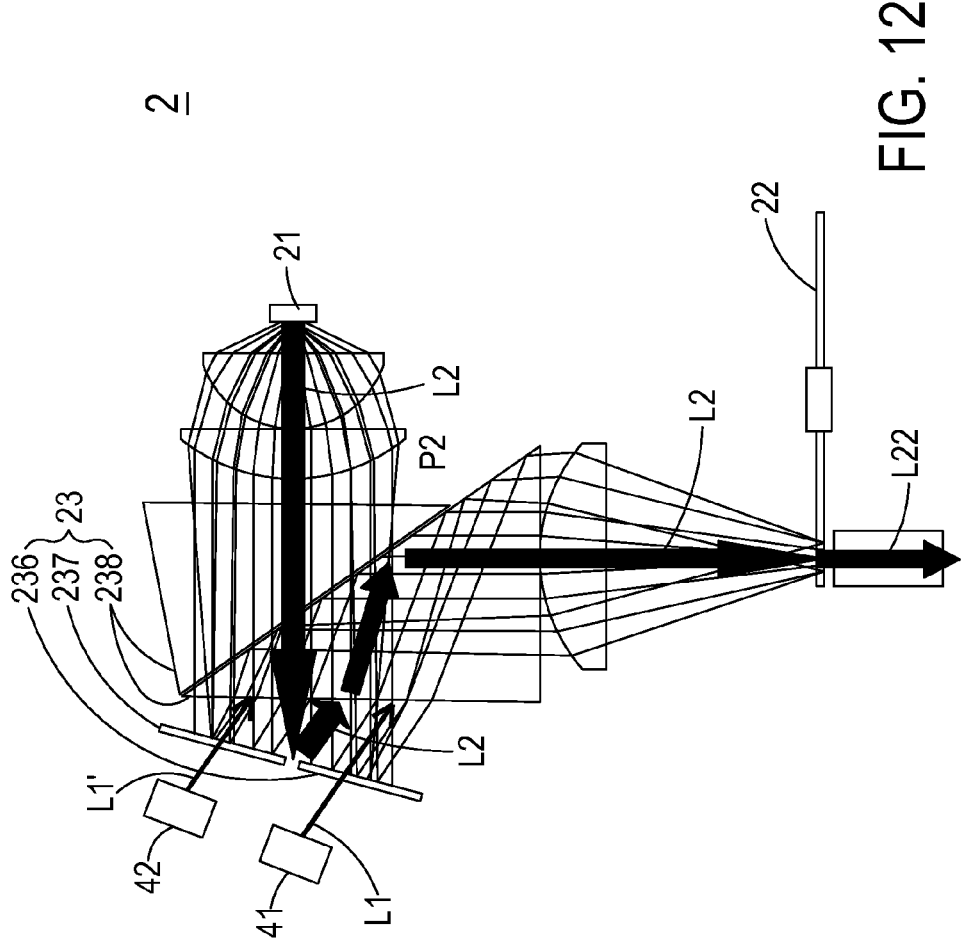
FIG. 12 schematically illustrates a second light beam of the second waveband light passing through the sequential light-filtering device of FIG. 10B.
Figure 13:
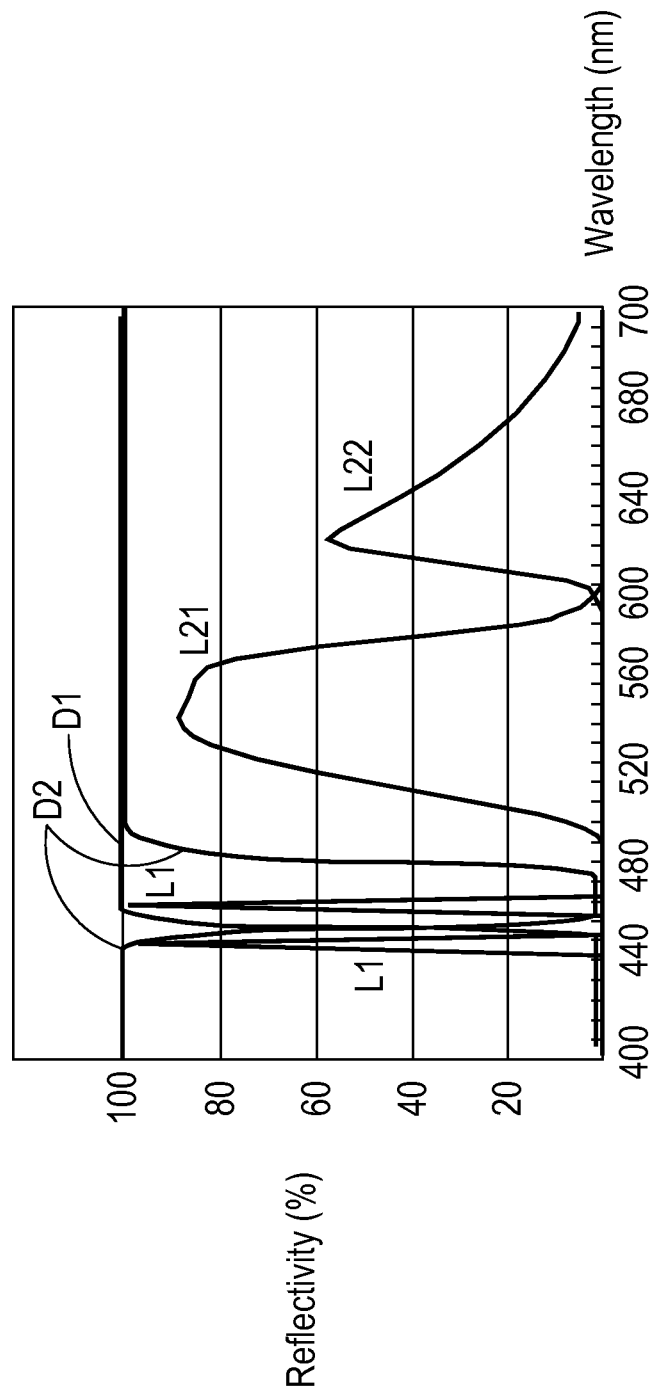
FIG. 13 schematically illustrates the reflection spectra of the first dichroic mirror and the second dichroic mirror of the illumination system according to the third embodiment of the present invention.

FIG. 10A schematically illustrates the architecture of an illumination system according to a third embodiment of the present invention. FIG. 10B schematically illustrates a sequential light-filtering device of the illumination system according to the third embodiment of the present invention. FIG. 11 schematically illustrates a first light beam of a second waveband light passing through the sequential light-filtering device of FIG. 10B. FIG. 12 schematically illustrates a second light beam of the second waveband light passing through the sequential light-filtering device of FIG. 10B. FIG. 13 schematically illustrates the reflection spectra of the first dichroic mirror and the second dichroic mirror of the illumination system according to the third embodiment of the present invention.

Please refer to FIGS. 10A, 10B, 11, 12 and 13. The illumination system 2 is applied to a projection device. For example, the projection device comprises a first solid-state light-emitting element 41 for emitting the first waveband light L1 and a second solid-state light-emitting element 42 for emitting another first waveband light L1'. In this embodiment, the illumination system 2 comprises a wavelength conversion element 21, a sequential light-filtering device 22, and a light guiding device 23. The functions of the wavelength conversion element 21 and the sequential light-filtering device 22 of this embodiment are identical to those of the above embodiments, and are not redundantly described herein. In this embodiment, the light guiding device 23 comprises a first dichroic mirror 236, a second dichroic mirror 237, and a total internal reflection prism (TIR prism) 238. The TIR prism 238 is arranged in and connected to a first optical path P1, a second optical path P2 and a third optical path P3. The first waveband light L1 from the first solid-state light-emitting element 41 is propagated along the first optical path P1, and the first waveband light L1' from the second solid-state light-emitting element 42 is also propagated along the first optical path P1. The first solid-state light-emitting element 41 and the second solid-state light-emitting element 42 are in parallel with each other and arranged side-by-side. The first dichroic mirror 236 is arranged between the first solid-state light-emitting element 41 and the TIR prism 238. The second dichroic mirror 237 is arranged between the second solid-state light-emitting element 42 and the TIR prism 238.

In some embodiments, the first waveband light L1 is a blue light with a wavelength of about 460 nm, the first waveband light L1' is a blue light with a wavelength of about 445 nm, and the second waveband light L2 is a yellow light. Moreover, the first solid-state light-emitting element 41 and the second solid-state light-emitting element 42 are blue solid-state light-emitting elements (e.g. blue laser elements), and the wavelength conversion element 21 is a yellow phorsphor agent. Generally, the yellow light is a mixed light of a green light and a red light. For sequentially projecting the three primary color lights, the first light beam L21 and the second light beam L22 of the second waveband light L2 are the green light and the red light, respectively.

In this embodiment, the first optical path P1 is the optical path between the first solid-state light-emitting element 41 (and the second solid-state light-emitting element 42) and the TIR prism 238, the second optical path P2 is the optical path between the wavelength conversion element 21 and the TIR prism 238, and the third optical path P3 is the optical path between the TIR prism 238 and the sequential light-filtering device 22 and outputted from the sequential light-filtering device 22. Moreover, the sequential light-filtering device 22 comprises a first segment 221, a second segment 222, and a third segment 223. The structures and functions of the sequential light-filtering device 22 are similar to those of the first embodiment, and are not redundantly described herein.

The operations of the illumination system 2 will be illustrated as follows in more details. The first solid-state light-emitting element 41 emits the first waveband light L1 along the first optical path P1, and the second solid-state light-emitting element 42 emits the first waveband light L1' along the first optical path P1. The first waveband light L1 is transmitted through the first dichroic mirror 236 and introduced into the TIR prism 238, and the first waveband light L1' is transmitted through the second dichroic mirror 237 and introduced into the TIR prism 238. The first waveband light L1 and the first waveband light L1' are guided by the TIR prism 238 and propagated along the third optical path P3. When the first segment 221 of the sequential light-filtering device 22 is rotated to the third optical path P3, the first waveband light L1 and the first waveband light L1' are directly transmitted through the first segment 221 and projected out.

On the other hand, when the second segment 222 or the third segment 223 of the sequential light-filtering device 22 is rotated to the third optical path P3, the first waveband light L1 and the first waveband light L1' are reflected by the second segment 222 or the third segment 223 of the sequential light-filtering device 22 and then introduced into the TIR prism 238. Then, the first waveband light L1 and the first waveband light L1' are reflected to the second dichroic mirror 237 and the first dichroic mirror 236 by the TIR prism 238. After the first waveband light L1 and the first waveband light L1' are reflected by the second dichroic mirror 237 and the first dichroic mirror 236, the first waveband light L1 and the first waveband light L1' are guided to the wavelength conversion element 21 by the TIR prism 238. When the first waveband light L1 and the first waveband light L1' are received or absorbed by the wavelength conversion element 21, the first waveband light L1 and the first waveband light L1' are converted into the second waveband light L2. The second waveband light L2 is propagated along the second optical path P2. Then, the second waveband light L2 is reflected by the TIR prism 238, the first dichroic mirror 236 and the second dichroic mirror 237 and directed along the third optical path P3. Then, the second waveband light L2 is directed to the sequential light-filtering device 22. When the second segment 222 of the sequential light-filtering device 22 is rotated to the third optical path P3, the first light beam L21 of the second waveband light L2 is transmitted through the second segment 222 and projected out (see FIG. 11). Whereas, when the third segment 223 of the sequential light-filtering device 22 is rotated to the third optical path P3, the second light beam L22 of the second waveband light L2 is transmitted through the third segment 223 and projected out (see FIG. 12). From the above discussions, the first waveband light L1 and the first light beam L21 and the second light beam L22 are sequentially projected out.

The reflection spectra of the first dichroic mirror 236 (i.e. the curve D1) and the second dichroic mirror 237 (i.e. the curve D2) of the light guiding device 23 are shown in FIG. 13.

Figure 14B:
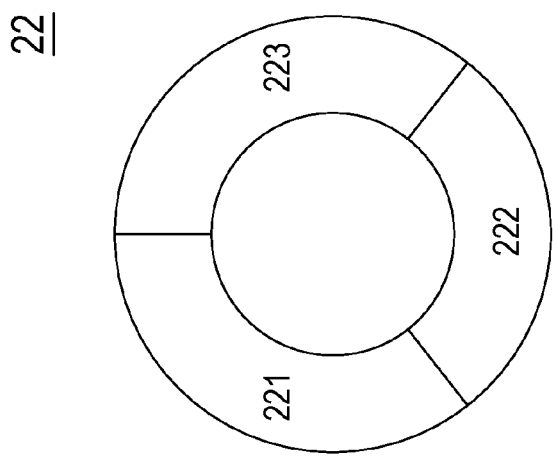
FIG. 14B schematically illustrates a sequential light-filtering device of the illumination system according to the fourth embodiment of the present invention.
Figure 14A:
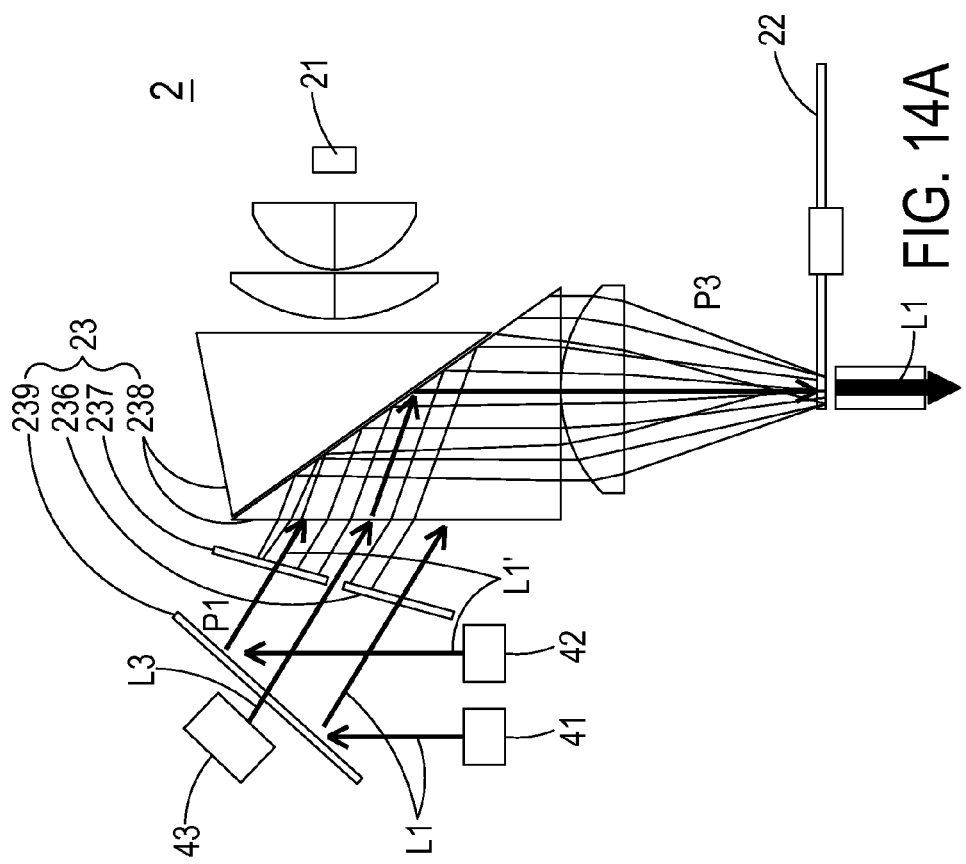
FIG. 14A schematically illustrates the architecture of an illumination system according to a fourth embodiment of the present invention.
Figure 15:
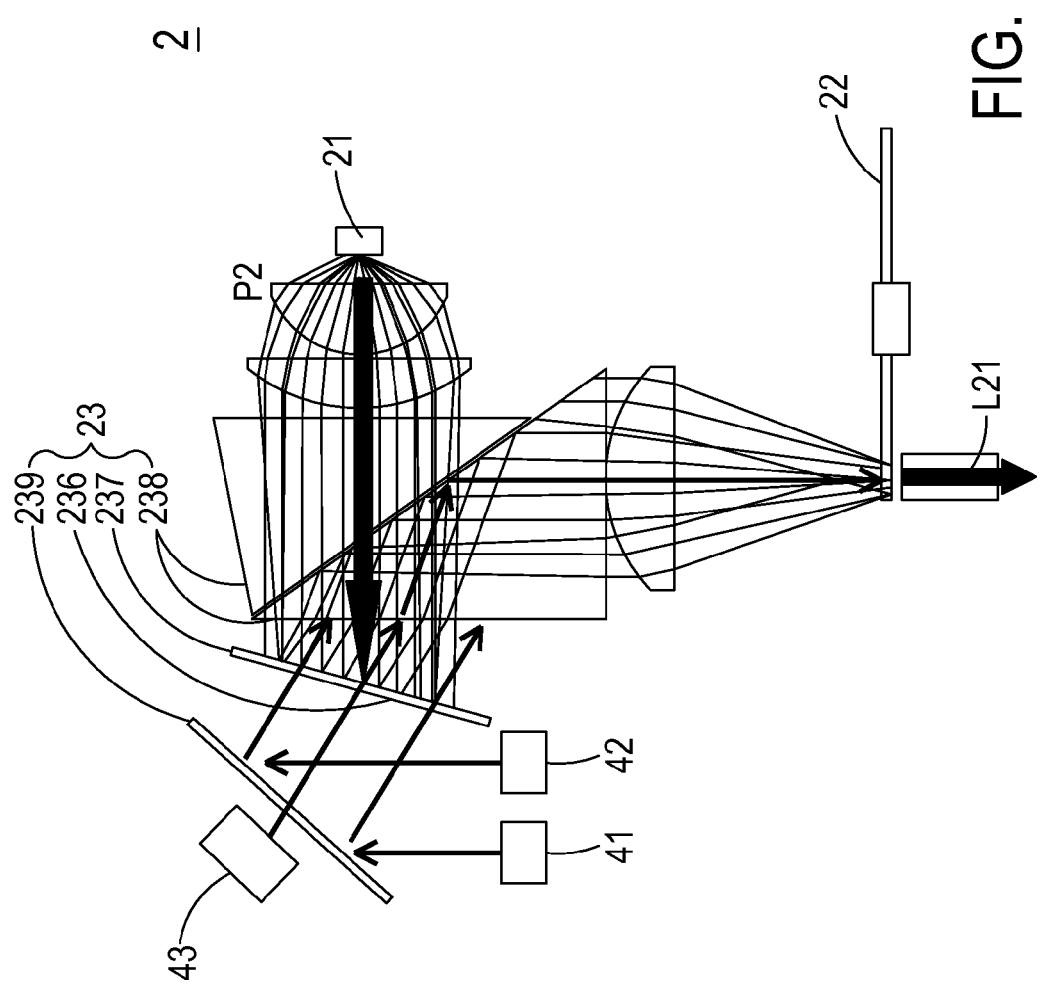
FIG. 15 schematically illustrates a first light beam of a second waveband light passing through the sequential light-filtering device of FIG. 14B.
Figure 16:
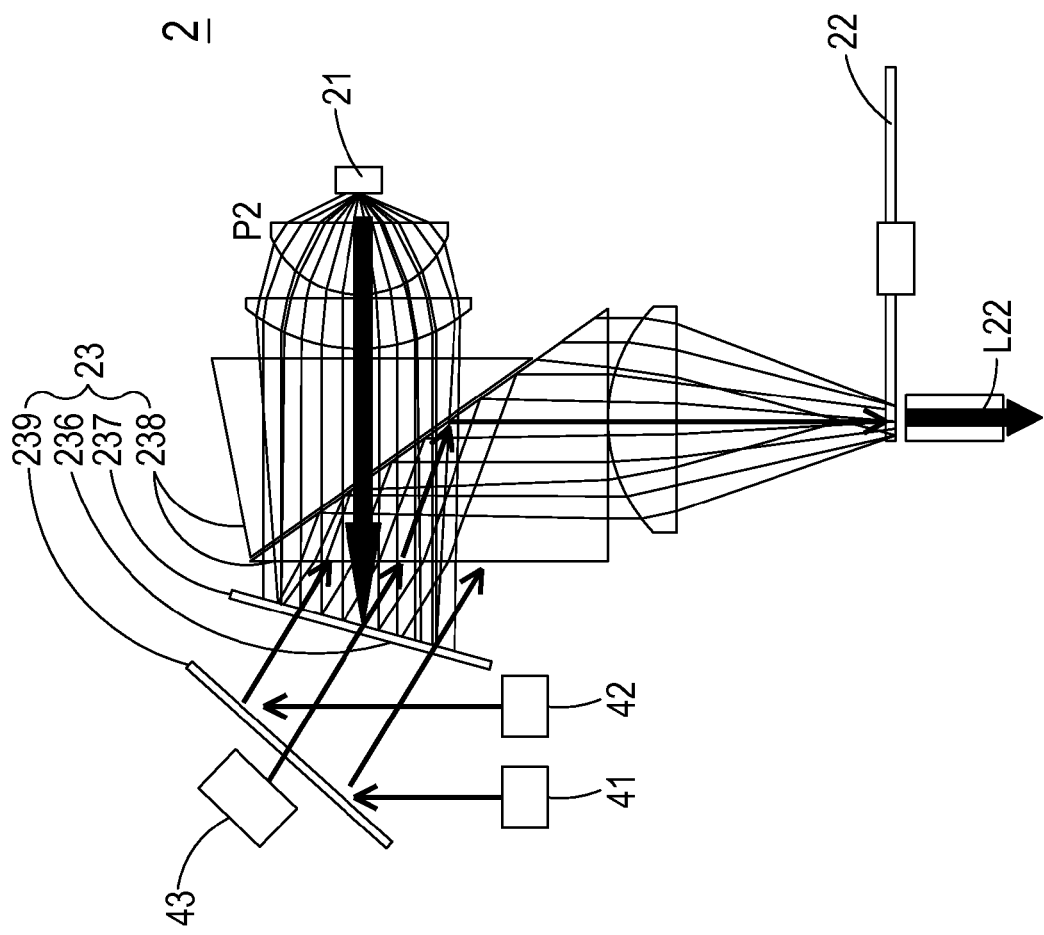
FIG. 16 schematically illustrates a second light beam of the second waveband light passing through the sequential light-filtering device of FIG. 14B.
Figure 17:
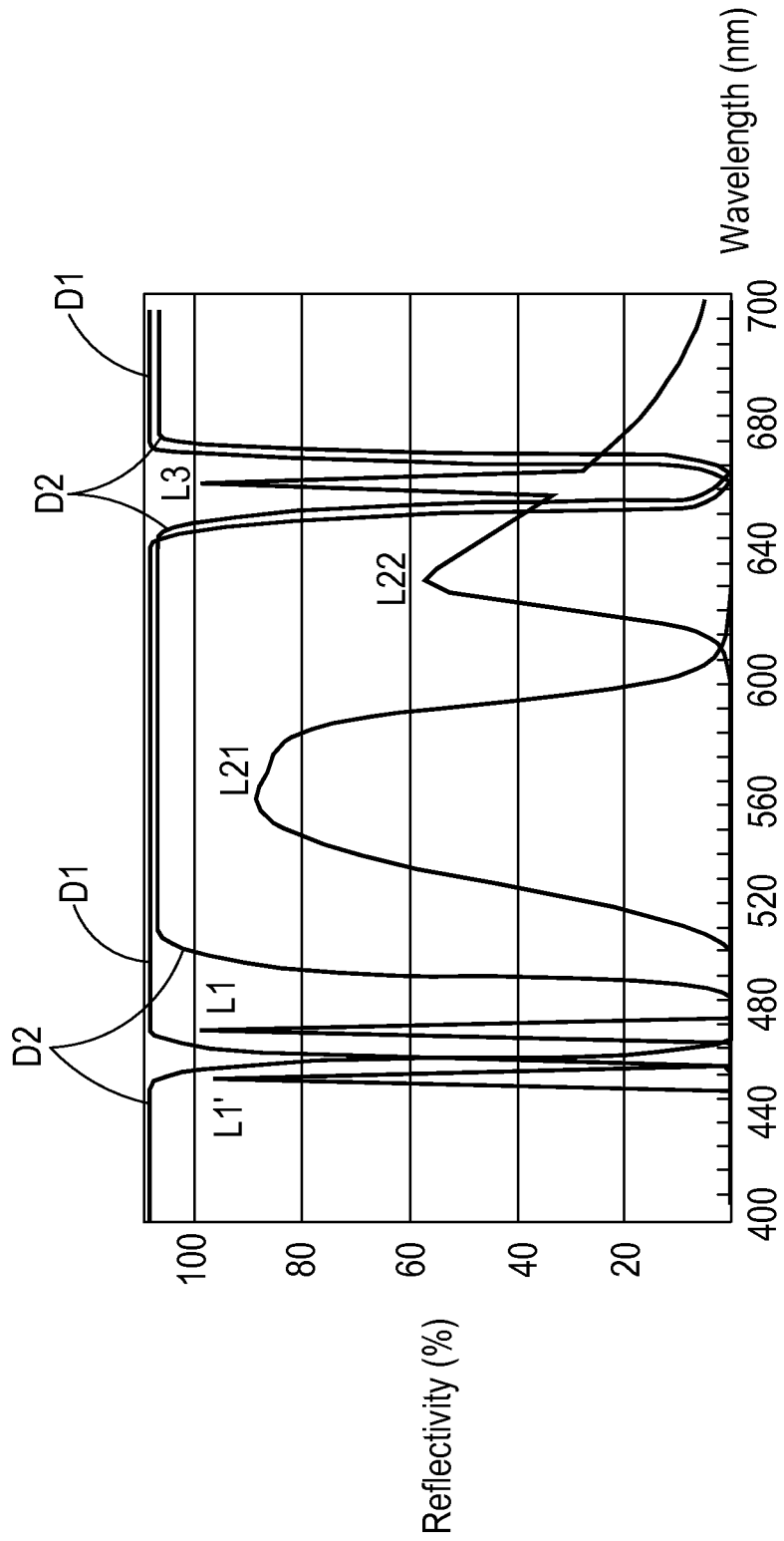
FIG. 17 schematically illustrates the reflection spectra of the first dichroic mirror and the second dichroic mirror of the illumination system according to the fourth embodiment of the present invention.

FIG. 14A schematically illustrates the architecture of an illumination system according to a fourth embodiment of the present invention. FIG. 14B schematically illustrates a sequential light-filtering device of the illumination system according to the fourth embodiment of the present invention. FIG. 15 schematically illustrates a first light beam of a second waveband light passing through the sequential light-filtering device of FIG. 14B. FIG. 16 schematically illustrates a second light beam of the second waveband light passing through the sequential light-filtering device of FIG. 14B. FIG. 17 schematically illustrates the reflection spectra of the first dichroic mirror and the second dichroic mirror of the illumination system according to the fourth embodiment of the present invention.

Please refer to FIGS. 14A, 14B, 15, 16 and 17. The illumination system 2 is applied to a projection device. For example, the projection device comprises a first solid-state light-emitting element 41 for emitting the first waveband light L1, a second solid-state light-emitting element 42 for emitting another first waveband light L1' and a third solid-state light-emitting element 43 for emitting a third waveband light L3. In this embodiment, the illumination system 2 comprises a wavelength conversion element 21, a sequential light-filtering device 22, and a light guiding device 23. The functions of the wavelength conversion element 21 and the sequential light-filtering device 22 of this embodiment are identical to those of the above embodiments, and are not redundantly described herein. In this embodiment, the light guiding device 23 comprises a first dichroic mirror 236, a second dichroic mirror 237, a total internal reflection prism (TIR prism) 238, and a third dichroic mirror 239. The first waveband light L1 from the first solid-state light-emitting element 41, the first waveband light L1' from the second solid-state light-emitting element 42 and the third waveband light L3 from the third solid-state light-emitting element 43 are all propagated along the first optical path P1. The first solid-state light-emitting element 41 and the second solid-state light-emitting element 42 are located at a first side of the third dichroic mirror 239. The third solid-state light-emitting element 43 is located at a second side of the third dichroic mirror 239. The third waveband light L3 is transmitted through the third dichroic mirror 239, and the first waveband light L1 and the first waveband light L1' are reflected by the third dichroic mirror 239.

In some embodiments, the first waveband light L1 is a blue light with a wavelength of about 460 nm, the first waveband light L1' is a blue light with a wavelength of about 445 nm, the second waveband light L2 is a yellow light, and the third waveband light L3 is a red light. Moreover, the first solid-state light-emitting element 41 and the second solid-state light-emitting element 42 are blue solid-state light-emitting elements (e.g. blue laser elements), the third solid-state light-emitting element 43 is a red solid-state light-emitting element, and the wavelength conversion element 21 is a yellow phorsphor agent. Generally, the yellow light is a mixed light of a green light and a red light. For sequentially projecting the three primary color lights, the first light beam L21 and the second light beam L22 of the second waveband light L2 are the green light and the red light, respectively. More preferably, the third waveband light L3 from the third solid-state light-emitting element 43 and the second light beam L22 of the second waveband light L2 are mixed with each other to produce a red light with better quality.

In this embodiment, the first optical path P1 is the optical path between the first solid-state light-emitting element 41 (and the second solid-state light-emitting element 42 and the third solid-state light-emitting element 43) and the TIR prism 238, the second optical path P2 is the optical path between the wavelength conversion element 21 and the TIR prism 238, and the third optical path P3 is the optical path between the TIR prism 238 and the sequential light-filtering device 22 and outputted from the sequential light-filtering device 22. Moreover, the sequential light-filtering device 22 comprises a first segment 221, a second segment 222, and a third segment 223. The structures and functions of the sequential light-filtering device 22 are similar to those of the first embodiment, and are not redundantly described herein.

The operations of the illumination system 2 will be illustrated as follows in more details. The first solid-state light-emitting element 41 emits the first waveband light L1 along the first optical path P1, the second solid-state light-emitting element 42 emits the first waveband light L1' along the first optical path P1, and the third solid-state light-emitting element 43 emits the third waveband light L3 along the first optical path P1. The first waveband light L1, the first waveband light L1' and the third waveband light L3 are guided by the light guiding device 23 and introduced into the TIR prism 238. Moreover, the first waveband light L1, the first waveband light L1' and the third waveband light L3 are guided by the TIR prism 238, propagated along the third optical path P3 and directed to the sequential light-filtering device 22. When the first segment 221 of the sequential light-filtering device 22 is rotated to the third optical path P3, the first waveband light L1 and the first waveband light L1' are directly transmitted through the first segment 221 and projected out.

On the other hand, when the second segment 222 or the third segment 223 of the sequential light-filtering device 22 is rotated to the third optical path P3, the first waveband light L1 and the first waveband light L1' are reflected by the second segment 222 or the third segment 223 of the sequential light-filtering device 22 and then introduced into the TIR prism 238. Then, the first waveband light L1 and the first waveband light L1' are reflected to the second dichroic mirror 237 and the first dichroic mirror 236 by the TIR prism 238. After the first waveband light L1 and the first waveband light L1' are reflected by the second dichroic mirror 237 and the first dichroic mirror 236, the first waveband light L1 and the first waveband light L1' are guided to the wavelength conversion element 21 by the TIR prism 238. When the first waveband light L1 and the first waveband light L1' are received or absorbed by the wavelength conversion element 21, the first waveband light L1 and the first waveband light L1' are converted into the second waveband light L2. The second waveband light L2 is propagated along the second optical path P2. Then, the second waveband light L2 is reflected by the TIR prism 238, the first dichroic mirror 236 and the second dichroic mirror 237 and directed along the third optical path P3. Then, the second waveband light L2 is directed to the sequential light-filtering device 22. When the second segment 222 of the sequential light-filtering device 22 is rotated to the third optical path P3, the first light beam L21 of the second waveband light L2 is transmitted through the second segment 222 and projected out (see FIG. 15).

Whereas, when the third segment 223 of the sequential light-filtering device 22 is rotated to the third optical path P3, the second light beam L22 of the second waveband light L2 is transmitted through the third segment 223 and projected out (see FIG. 16). From the above discussions, the first waveband light L1 and the first light beam L21 and the second light beam L22 are sequentially projected out. Moreover, the third waveband light L3 and the second light beam L22 of the second waveband light L2 are mixed with each other to produce a red light with better quality.

The reflection spectra of the first dichroic mirror 236 (i.e. the curve D1) and the second dichroic mirror 237 (i.e. the curve D2) of the light guiding device 23 are shown in FIG. 17.

From the above descriptions, the present invention provides an illumination system and a projection apparatus with the illumination system. The wavelength conversion element and the sequential light-filtering device are arranged in the second optical path and the third optical path, respectively. Consequently, the structures are simplified, the overall volume of the projection device is reduced, the filtering performance is enhanced, and the image quality is enhanced. Moreover, the illumination system uses the ordinary optical elements to create special optical paths. That is, the first optical path is the optical path between the first solid-state light-emitting element and the light guiding device, the second optical path is the optical path between the wavelength conversion element and the light guiding device, and the third optical path is the optical path between the light guiding device and the sequential light-filtering device and outputted from the sequential light-filtering device. Under this circumstance, the performance of the color lights and the image quality are enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An illumination system for a projection device, the projection device emitting a first waveband light along a first optical path, the illumination system comprising:
   a wavelength conversion element for converting the first waveband light into a second waveband light, wherein the second waveband light is propagated along a second optical path;
   a sequential light-filtering device for sequentially filtering the first waveband light and the second waveband light along a third optical path, wherein the sequential light-filtering device comprises a first segment, a second segment and a third segment; and
   a light guiding device arranged in and connected to the first optical path, the second optical path and the third optical path for guiding the first waveband light and the second waveband light along the third optical path or guiding the first waveband light to the wavelength conversion element, so that the first waveband light and a first light beam and a second light beam of the second waveband light are sequentially filtered by the sequential light-filtering device and sequentially projected out, wherein the first waveband light is reflected by the second segment or the third segment, and then guided to the wavelength conversion element by the light guiding device.

2. The illumination system according to claim 1, wherein the first waveband light is a blue light, the wavelength conversion element is a yellow phosphor agent, and the second waveband light is a yellow light.

3. The illumination system according to claim 2, wherein the first light beam and the second light beam of the second waveband light are a green light and a red light, respectively.

4. The illumination system according to claim 1, wherein the first optical path is an optical path between a first solid-state light-emitting element and the light guiding device, the second optical path is an optical path between the wavelength conversion element and the light guiding device, and the third optical path is an optical path between the light guiding device and the sequential light-filtering device and outputted from the sequential light-filtering device.

5. The illumination system according to claim 1, wherein the first segment is a transparent segment, the second segment is a green segment, and the third segment is a red segment.

6. The illumination system according to claim 5, wherein the first waveband light is emitted by a first solid-state light-emitting element, and the light guiding device comprises:
a polarization beam splitter arranged in the first optical path and aligned with the first solid-state light-emitting element, wherein a P-polarized light of the first waveband light is transmissible through the polarization beam splitter, and an S-polarized light of the first waveband light is reflected by the polarization beam splitter;
a dichroic mirror arranged beside the polarization beam splitter and in parallel with the polarization beam splitter; and
a quarter wave plate opposed to the polarization beam splitter with respect to the dichroic mirror, wherein if the P-polarized light of the first waveband light is transmitted through the quarter wave plate twice, the first P-polarized light is converted into the S-polarized light.

7. The illumination system according to claim 6, wherein after the first waveband light is transmitted through the polarization beam splitter of the light guiding device and propagated along the third optical path, the first waveband light is transmitted through the quarter wave plate and directed to the sequential light-filtering device, wherein when the first segment of the sequential light-filtering device is rotated to the third optical path, the first waveband light is directly transmitted through the first segment and projected out, wherein when the second segment or the third segment of the sequential light-filtering device is rotated to the third optical path, the first waveband light is reflected by the second segment or the third segment of the sequential light-filtering device, transmitted through the quarter wave plate, transmitted through the dichroic mirror and reflected to the wavelength conversion element by the polarization beam splitter.

8. The illumination system according to claim 7, wherein when the first waveband light is received or absorbed by the wavelength conversion element, the first waveband light is converted into the second waveband light, wherein the second waveband light is reflected by the dichroic mirror of the light guiding device and directed along the third optical path, and then the second waveband light is directed to the sequential light-filtering device, wherein when the second segment of the sequential light-filtering device is rotated to the third optical path, the first light beam of the second waveband light is transmitted through the second segment and projected out, wherein when the third segment of the sequential light-filtering device is rotated to the third optical path, the second light beam of the second waveband light is transmitted through the third segment and projected out.

9. The illumination system according to claim 5, wherein the first waveband light is emitted by a first solid-state light-emitting element, and the light guiding device comprises:
a polarization beam splitter cube arranged in and connected to the first optical path, the second optical path and the third optical path, wherein the polarization beam splitter cube is arranged downstream of the first solid-state light-emitting element, wherein a P-polarized light of the first waveband light is transmissible through the polarization beam splitter cube, and an S-polarized light of the first waveband light is reflected by the polarization beam splitter cube; and
a quarter wave plate opposed to the first solid-state light-emitting element with respect to the polarization beam splitter cube, wherein the quarter wave plate twice is arranged in the third optical path.

10. The illumination system according to claim 9, wherein after the first waveband light is transmitted through the polarization beam splitter cube of the light guiding device and propagated along the third optical path, the first waveband light is transmitted through the quarter wave plate and directed to the sequential light-filtering device, wherein when the first segment of the sequential light-filtering device is rotated to the third optical path, the first waveband light is directly transmitted through the first segment and projected out, wherein when the second segment or the third segment of the sequential light-filtering device is rotated to the third optical path, the first waveband light is reflected by the second segment or the third segment of the sequential light-filtering device, transmitted through the quarter wave plate, and reflected to the wavelength conversion element by the polarization beam splitter cube.

11. The illumination system according to claim 10, wherein when the first waveband light is received or absorbed by the wavelength conversion element, the first waveband light is converted into the second waveband light, wherein the second waveband light is reflected by the polarization beam splitter cube of the light guiding device and directed along the third optical path, and then the second waveband light is directed to the sequential light-filtering device, wherein when the second segment of the sequential light-filtering device is rotated to the third optical path, the first light beam of the second waveband light is transmitted through the second segment and projected out, wherein when the third segment of the sequential light-filtering device is rotated to the third optical path, the second light beam of the second waveband light is transmitted through the third segment and projected out.

12. A projection device, comprising:
a first solid-state light-emitting element for emitting a first waveband light along a first optical path; and
an illumination system comprising:
a wavelength conversion element for converting the first waveband light into a second waveband light, wherein the second waveband light is propagated along a second optical path;
a sequential light-filtering device for sequentially filtering the first waveband light and the second waveband light along a third optical path, wherein the sequential light-filtering device comprises a first segment, a second segment and a third segment; and a light guiding device arranged in and connected to the first optical path, the second optical path and the third optical path for guiding the first waveband light and the second waveband light along the third optical path or guiding the first waveband light to the wavelength conversion element, so that the first waveband light and a first light beam and a second light beam of the second waveband light are sequentially filtered by the sequential light-filtering device and sequentially projected out, wherein the first waveband light is reflected by the second segment or the third segment, and then guided to the wavelength conversion element by the light guiding device.

13. The projection device according to claim 12, wherein the first waveband light is a blue light, the wavelength conversion element is a yellow phorsphor agent, and the second waveband light is a yellow light, wherein the first light beam and the second light beam of the second waveband light are a green light and a red light, respectively.

14. The projection device according to claim 12, wherein the first optical path is an optical path between a first solid-state light-emitting element and the light guiding device, the second optical path is an optical path between the wavelength conversion element and the light guiding device, and the third optical path is an optical path between the light guiding device and the sequential light-filtering device and outputted from the sequential light-filtering device.

15. The projection device according to claim 12, wherein the sequential light-filtering device comprises a first segment, a second segment and a third segment, wherein the first segment is a transparent segment, the second segment is a green segment, and the third segment is a red segment.

16. The projection device according to claim 15, further comprising a second solid-state light-emitting element for emitting an additional first waveband light along the first optical path, wherein the light guiding device comprises a first dichroic mirror, a second dichroic mirror and a total internal reflection prism, wherein the total internal reflection prism is arranged in and connected to the first optical path, the second optical path and the third optical path, the first dichroic mirror is arranged between the first solid-state light-emitting element and the total internal reflection prism, and the second dichroic mirror is arranged between the second solid-state light-emitting element and the total internal reflection prism.

17. The projection device according to claim 16, wherein the first waveband light is a blue light with a peak wavelength of about 460 nm, and the additional first waveband light is a blue light with a peak wavelength of about 445 nm.

18. The projection device according to claim 17, wherein after the first waveband light is transmitted through the first dichroic mirror and introduced into the total internal reflection prism and the additional first waveband light is transmitted through the second dichroic mirror and introduced into the total internal reflection prism, the first waveband light and the additional first waveband light are guided by the total internal reflection prism, propagated along the third optical path and directed to sequential light-filtering device, wherein when the first segment of the sequential light-filtering device is rotated to the third optical path, the first waveband light and the additional first waveband light are directly transmitted through the first segment, or the first waveband light and the additional first waveband light are reflected by the second segment or the third segment and guided to the wavelength conversion element by the total internal reflection prism.

19. The projection device according to claim 18, wherein when the first waveband light and the additional first waveband light are received or absorbed by the wavelength conversion element, the first waveband light is converted into the second waveband light, wherein the second waveband light is guided by the total internal reflection prism, the first dichroic mirror and the second dichroic mirror and directed to the sequential light-filtering device, so that the first light beam and the second light beam of the second waveband light are sequentially transmitted through the second segment and the third segment of the sequential light-filtering device and projected out.

20. The projection device according to claim 16, further comprising a third solid-state light-emitting element for emitting a third waveband light along the first optical path, wherein the light guiding device further comprises a third dichroic mirror, wherein the first solid-state light-emitting element and the second solid-state light-emitting element are located at a first side of the third dichroic mirror, and the third solid-state light-emitting element is located at a second side of the third dichroic mirror, wherein the third waveband light is transmitted through the third dichroic mirror, and the first waveband light and the additional first waveband light are reflected by the third dichroic mirror.

* * * * *